(12) United States Patent  (10) Patent No.: US 9,171,153 B2
Jorgensen  (45) Date of Patent: Oct. 27, 2015

(54) BLOOM FILTER WITH MEMORY ELEMENT

(71) Applicant: HEWLETT-PACKARD DEVELOPMENT COMPANY, L.P., Houston, TX (US)

(72) Inventor: Steven Glen Jorgensen, Newcastle, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 148 days.

(21) Appl. No.: 13/896,378

(22) Filed: May 17, 2013

(65) Prior Publication Data

US 2014/0344934 A1  Nov. 20, 2014

(51) Int. Cl.
*G06F 11/00* (2006.01)
*G06F 21/56* (2013.01)
*H04L 29/06* (2006.01)

(52) U.S. Cl.
CPC .............. *G06F 21/56* (2013.01); *H04L 63/145* (2013.01); *H04L 63/1416* (2013.01)

(58) Field of Classification Search
CPC ..... H04L 63/145; G06F 21/56; G06F 21/566; G06F 21/564; G06F 21/562
USPC ..................................... 726/22–25; 713/188
See application file for complete search history.

(56) References Cited

U.S. PATENT DOCUMENTS

| 7,444,515 | B2 | 10/2008 | Dharmapurikar et al. | |
|---|---|---|---|---|
| 8,055,633 | B2 | 11/2011 | Whyte | |
| 2005/0257264 | A1* | 11/2005 | Stolfo et al. | 726/23 |
| 2008/0154852 | A1* | 6/2008 | Beyer et al. | 707/3 |

FOREIGN PATENT DOCUMENTS

KR  20090065306  6/2009

OTHER PUBLICATIONS

Liu, L. et al.; Bloom Piller Based Index for Query Over Encrypted Character Strings in Database; 2009 World Congress on COmputer Science and Information Engineering; on pp. 303-307; vol. 1; 2008 IEEE.
Moraru, I. et al; Exact Pattern Matching with Feed-forward Bloom Filters; http://www.siam.org/proceedings/alenex/2011/alx11_01_morarui.pdf>; 2011.

* cited by examiner

*Primary Examiner* — Baotran N To
(74) *Attorney, Agent, or Firm* — Mahamedi Paradice LLP

(57) ABSTRACT

Techniques are provided for determining if an element is contained in a set of elements. In one aspect, an element may be received and inserted into a bloom filter. The element may also be inserted into a memory associative on the bloom filter indexes. In another aspect, a search element may be received and compared to a bloom filter. If the search element is included in the bloom filter, a memory may be used to determine if the search element is included in the set of elements.

10 Claims, 5 Drawing Sheets

BLOOM FILTER WITH MEMORY ELEMENT

BACKGROUND

There are many situations in which determining if a specified sequence of characters is included in a larger pool of characters is needed. For example, a network security appliance may examine all packets traversing a network in order to detect malicious packets. For example, a packet may contain a portion of a virus that is identifiable by a certain sequence of characters in the packet. By examining every packet for the sequence of characters, it may be determined if the packet may contain at least part of the virus. Once it is determined that a particular character string is present, further action may be taken. For example, in the case of a network security appliance, the packet may be forwarded to additional logic to determine if the packet actually contains the virus, or if the character sequence just happened to be included in the packet for non-malicious reasons.

BRIEF DESCRIPTION OF THE DRAWINGS

FIG. 2 is an example of a high level flow diagram for inserting an element into the set of elements that are being searched for.

FIG. 3 is another example of a high level flow diagram for inserting an element into the set of elements that are being searched for.

DETAILED DESCRIPTION

A need often arises to search large set of characters for the presence of certain sequences of characters, referred to as character strings. For example, a network security device may be used to examine every packet flowing through the network to identify malicious packets and packet streams by examining each packet for the presence of certain character strings. The presence of a "signature" character string may indicate that the packet is part of a flow that includes a computer virus. In order to achieve this result, the network security device must compare the contents of every packet to a list of possible signatures to determine if the signature is contained in the packet. A similar situation may occur anytime a large amount of data needs to be scanned to detect the presence of specified character strings.

Such a comparison can be very resource intensive. Further exacerbating the problem is the fact that the vast majority of packets will not match a signature. Thus, any processing used to analyze packets which do not match a signature is essentially wasted. It would be beneficial to have a mechanism that can quickly determine if a packet contains a signature of interest. One mechanism that has been used is a bloom filter.

A bloom filter is a data structure that can be used to quickly determine if an element is included in a set. For example, a network security device may have a plurality of known virus signatures. This plurality of signatures can be considered a set of elements. Bloom filters may be used to compare an arbitrary input to the set of elements. If the Bloom filters return a false result, it can be guaranteed that the input is not included in the set of elements. However, if the bloom filters return a positive result, this only indicates that the input has the possibility of being included in the set of elements. In other words, the bloom filters may produce false positive results.

Techniques provided herein overcome the problem of false positives in bloom filters. An element is received and processed through a plurality of bloom filters. If the bloom filters indicate a negative result, it can be guaranteed that the element is not included in the set of elements. However, if the bloom filters return a positive result, a second step of processing occurs. In the second step, the particular element used in the initial application of the bloom filters are examined to determine if the particular element of interest was actually inserted into the set of elements. The process is described in further detail below and in conjunction with the appended figures.

Figure 1:
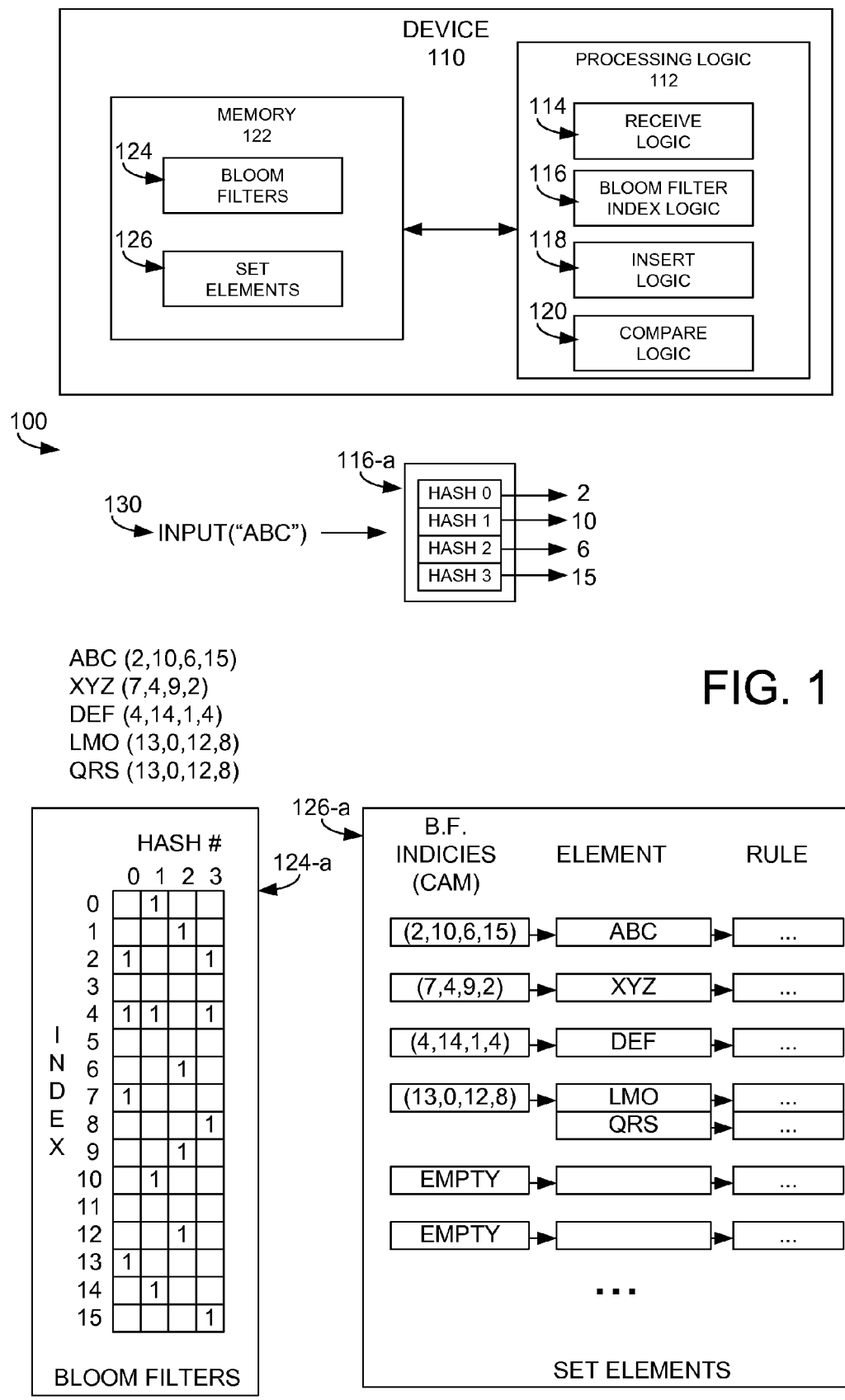
FIG. 1 is an example of a system utilizing a memory to eliminate false positives when using a bloom filter.

FIG. 1 is an example of a system utilizing a memory to eliminate false positives when using a bloom filter. The system 100 may include a device 110. For example, the device 110 may be included in a network security appliance. However, the techniques described herein are applicable anywhere that bloom filters may be used to determine inclusion in a set. The device may typically be implemented in hardware, such as in an Application Specific Integrated Circuit (ASIC). Although shown as a standalone device, it should be understood that the capabilities described herein may be included within hardware that also provides other functionality.

The device 110 may include processing logic 112. The processing logic may be implemented using discrete logic gates, processors, field programmable gate arrays, or any other type of logic. The processing logic may include receive logic 114, bloom filter index logic 116, insert logic 118, and compare logic 120. The various logic blocks may be used to implement the techniques described herein. The operation of these logic blocks is described in further detail below.

The device 100 may also include memory 122 storing various data structures. The data structures can include bloom filters 124 and a set element structure 126. The bloom filters may be used to determine if an element is potentially included in a set, while the set element structure may be used to eliminate false positives that result from the bloom filters. The data structures 124 and 126 are also depicted in expanded form as elements 124-a and 126-a respectively.

In order to aid in the description of the techniques presented herein, the following operational example is provided. Assume at the beginning of the example that the set of elements, and as such the bloom filters, are empty. Also assume that the set elements structure is empty. In other words, in the beginning, the device is not searching for any elements. In order to add an element to the bloom filters, the element is first received by the receive logic 114. The element to be inserted may be referred to as the insertion element. The insertion element may be processed by a number of hash functions 116-a. In the present example, there are four hash functions shown, however it should be understood that this is for purposes of explanation and not limitation. These hash functions may be implemented in the bloom filter index logic 116. As shown, input 130, which consists of the characters ABC is sent to the hash functions 116-a. The result of this operation is that each hash function produces a value for the input. Each of these values may be referred to as a bloom filter index. As shown, input 130 (ABC) has produced bloom filter indexes 2, 10, 6, and 15. It should be understood that this is an ordered set of indexes. For purposes of this description, groupings of four values within parenthesis indicate the results of the bloom filter index logic.

The insert logic 118 may be used to insert the element. In order to insert the element into the bloom filters, the bloom filter indexes are examined. For each hash function, the entry identified by the index is set to true by the insert logic in the bloom filter associated with the particular hash. For example, the input ABC produced bloom filter indexes 2, 10, 6, and 15 for hash functions 0, 1, 2, and 3 respectively. Thus, looking at bloom filters 124-a, it can be seen that indexes 2, 10, 6, and 15 have been set to true for their respective bloom filters.

In addition to setting the index values in the bloom filters, the set elements structure is also set to reflect the insertion of the element ABC. In one example implementation, the set element structure is implemented as a data structure in memory, with at least a portion of the memory being a content addressable memory (CAM). The ordered bloom filter indexes may be inserted into the content addressable portion of the memory. The particular element that is being inserted may also be added to the set elements structure and is associated with the ordered indexes that was inserted into the CAM portion of the memory. Finally, a rule may be associated with the set element. The rule may specify what action is to be taken upon a match of the particular set element. For example, the rule may indicate that further processing on a matching element is needed. The particular actions of a rule are relatively unimportant and are dependent on the application utilizing the techniques described herein.

In the present example, it can be seen that element ABC has been added to the set element structure as entry 150. In order to insert the element, it is first determined if the indices hit on an existing CAM entry. If not, an empty entry is found. A non-empty entry is described in further detail below. The particular indexes (2,10,6,15) are then placed in the bloom filter indices CAM. The actual element is also stored and is associated with the CAM entry. Finally, the rule for the set element ABC is associated with the set element. This same process may occur for any elements that are to be added to the bloom filter. For example, element XYZ (7,4,9,2) 151 causes the corresponding indices in the bloom filters 124-a to be set to true. In addition, the set element structure is modified such that the indices are placed in the CAM, the element is associated with the CAM entry and the rule associated with the element is also associated with the element.

The same process can occur for elements DEF (4, 14, 1, 4) 152 and LMO (13, 0, 12, 8) 153. The next element, QRS, when processed by the hash functions results in indexes 13,0, 12, and 8. It should be noted that these index values happen to be the same as the indexes produced for element LMO. When adding the element QRS to the set element structure, there is no need to find an empty CAM entry, as an entry already exists. The new element, QRS 154 may simply be associated with the previously added entry that is associated with element LMO's 153 CAM entry. In such cases, both elements are associated with the same CAM entry.

Now that the bloom filter and set element structure have been populated, the use of the system to quickly check for the presence of an element in the set of elements while eliminating the possibility of false positives may now be explained. For purposes of this explanation, several examples are presented to describe various use cases. In the first example, assume that it is desired to know if element PQR is included in the set of elements inserted into the bloom filter. In other words, is string PQR included in the set of strings that are being searched for. Assume that the bloom filter indexes generated by the bloom filter index logic 116 for the string PQR are (6,9,12,15). The compare logic 120 may be used to determine if the element PQR has been inserted into the bloom filters. As should be clear, determining that PQR is not in the set of elements is as simple as examining the first bloom filter. Because index 6 in the bloom filter associated with hash 0 is not set to true in the bloom filters, there is no possibility of the element being included in the set (otherwise the index would have been set to true).

The second example presents a more interesting case. Assume that it is desired to determine if element QWE is included in the set elements. Assume element QWE has bloom filter indices (2, 0, 9, 15). Here, each of the indexes in the bloom filters corresponding to the element QWE has been set, however, not by the element QWE. For example, in the bloom filter associated with hash 0, index 2 was set by element ABC. The bloom filter associated with hash 1 had index 0 set by both elements LMO and QRS. The bloom filter associated with hash 2 had index 9 set by element XYZ. The bloom filter associated with Hash 3 had index 15 set by element ABC. Thus, even though element QWE is not included in the set of elements, the bloom filters only mechanism would have indicated that element QWE was in the set of elements. In other words, element QWE would have resulted in a false positive.

The techniques described herein overcome this problem of false positives through the set element structure. Once an element has passed through the bloom filters and has been determined as possibly being included in the set of elements, the set element structure may be examined by compare logic 120 to determine if the element was actually inserted or if it is a false positive. Here, the ordered index for element QWE is (2, 0, 9, 15). Because that particular ordering of indexes has not been entered into the CAM, there will be no CAM hit when the set element structure is accessed. As such, this means that the particular combination of indexes produced by element QWE was never inserted into the set of elements, and is not included in the set of elements. Thus, the false positive produced by the bloom filter has been overcome.

In addition to overcoming false positives as has been described above, the techniques described herein also prevent false positives in the case where two elements just so happen to have bloom filter indexes that are the same, but only one of the elements was inserted into the set of elements. For example, assume that element PDQ has bloom filter indexes (2,10,6,15) which just so happens to be exactly the same as element ABC. Element ABC is included in the set. The bloom filter analysis will indicate element PDQ as potentially being included in the set of elements. The CAM search will result in a hit on ordered indexes (2,10,6,15) because that set of ordered indexes was inserted by element ABC. An additional comparison is done by the compare logic between the element and the elements associated with the CAM entry. In this example, CAM entry 150 is only associated with element ABC, and as such element PDQ is not included in the set of elements. The false positive is once again eliminated.

The techniques described herein are also useful when two elements have the same ordered bloom filter indexes and are both included in the set of elements. For example, element QRS has indexes (13,0,12,8). The bloom filters would indicate this element as possibly being within the set of elements. A CAM search would result in a hit 153 on those indexes. The element QRS may then be compared to all elements associated with this CAM entry. Here, both elements QRS and LMO are associated with CAM entry 153. Thus, because the element QRS matches, it can be determined that the element is within the set of elements.

Although the above description was based on using a CAM that stores the bloom filter indexes of an element, an alternate example implementation may directly store the element in the CAM. Thus, once the bloom filters have determined that an element may potentially be included in the set of elements, the CAM structure may be searched using the element itself.

In such an implementation, the step of locating the CAM entry and then comparing the element associated with the CAM entry to the search element can be avoided.

In yet another example implementation (not shown), the CAM portion of the memory may be eliminated completely. The ordered indexes may be hashed to obtain a location in memory. The elements (and the corresponding rules) associated with the hash of the ordered indexes may be stored starting at the location in memory. Once the bloom filters have determined that an element may be included in the set of elements, the ordered bloom filter indexes may be hashed to determine the location in memory. All elements associated with the location in memory may then be compared to the search element to determine if the search element is included in the set of elements.

This two stage approach eliminates the possibility of false positives without requiring excessive amounts of processing. The bloom filters may take care of the majority of cases independently. If an element is definitively not in the set, this can be determined by the bloom filters alone. It is only in the cases where the element has a possibility of being in the set of elements that the second stage of processing occurs. Thus, it is likely that the majority of cases do not even reach the second stage of processing, thus reducing the amount of processing needed for the majority of cases. In addition, because the set elements structure is efficiently organized, the elimination of false positives, when needed, is also efficient.

The above description was simplified to relatively small bloom filters with a small number of hash functions for purposes of ease of description only. The techniques described herein are applicable regardless of the size of the bloom filters or of the number of hash functions. In fact, an actual implementation may include indexes in the range of tens of thousands with significantly larger number of hash functions. The techniques described herein are not limited by the selected size of the bloom filter or number of hash functions.

Furthermore, the above description was presented in terms of elements that were a fixed number of characters, and the number of characters was the same for all elements. This was for purposes of explanation only. The techniques described herein are applicable regardless of the length of the element that is being searched for or if the elements have different lengths. What should be understood is that the results of the initial hash are compared to the bloom filter to determine if the element is included in the set of elements. The creation of the hash results are not dependent on the length of the input.

In addition, the techniques above are applicable in any situation wherein a bloom filter may be employed. Although the example of a network security device was mentioned, it should be understood that the techniques are applicable to any use of bloom filters.

Figure 2:
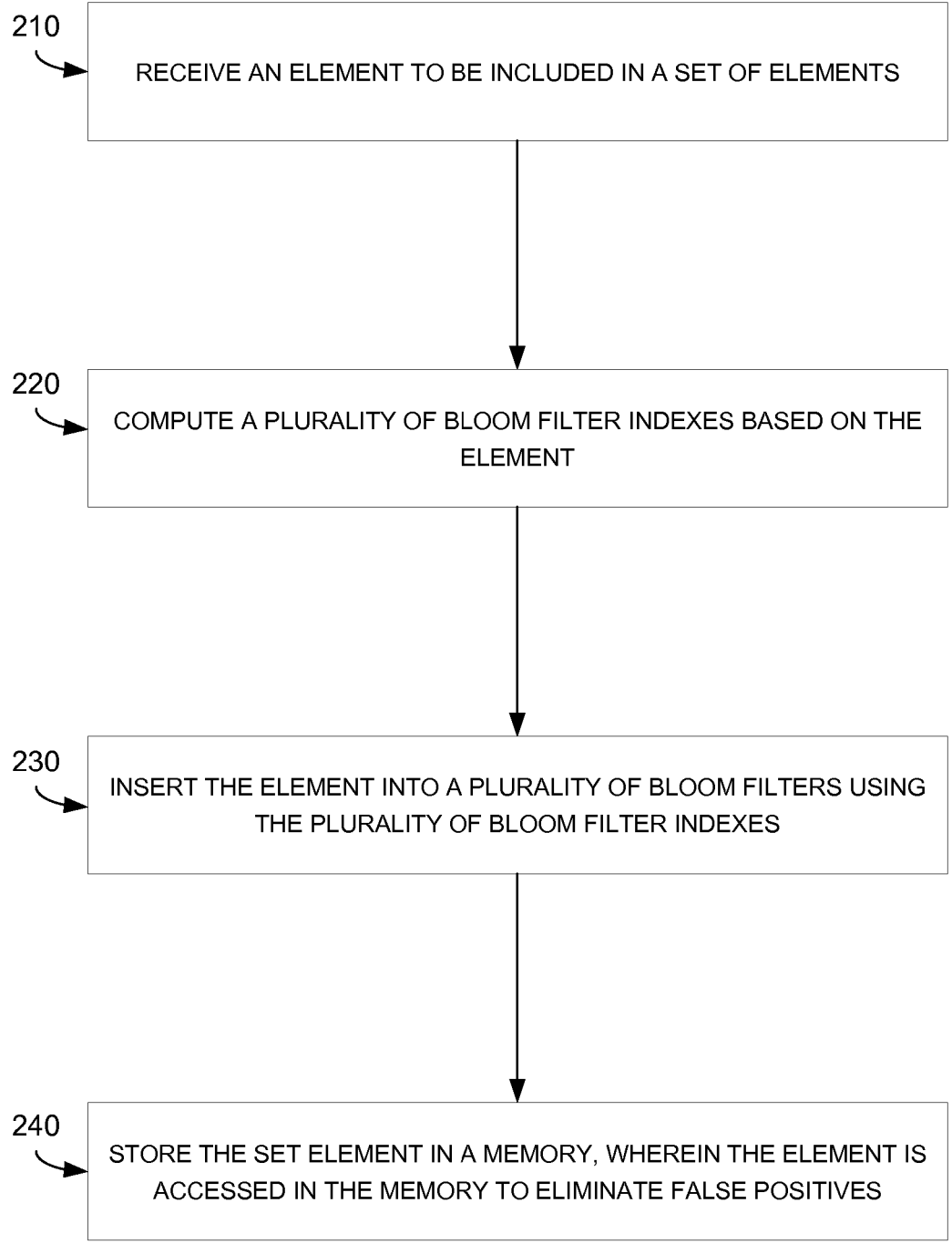

FIG. 2 is an example of a high level flow diagram for inserting an element into the set of elements that are being searched for. In block 210 a set element to be included in a set of elements may be received. For example, this element may be an element that is to be inserted into a bloom filter in accordance with the techniques described herein. At a later point in time, the bloom filters may be queried to determine if this element has been added to the set. In block 220 a plurality of bloom filter indexes may be computed based on the set element. In other words the index values for each of the bloom filters may be determined. In some implementations, the computation may be done through a hashing function. Regardless of implementation, a plurality of bloom filter indexes may be determined.

In block 230, the set element may be inserted into the bloom filter using the plurality of bloom filter indexes. In other words, the computed bloom filter indexes are used to determine which entries in the bloom filters will have their bits set to a true value and which ones will remain null. In block 240, the set element may be stored in a memory, wherein the element is accessed in the memory to eliminate false positives. As explained above, when the bloom filters determine that an element may possibly be included in the set of elements, accessing the memory may be used to eliminate a false positive.

Figure 3:
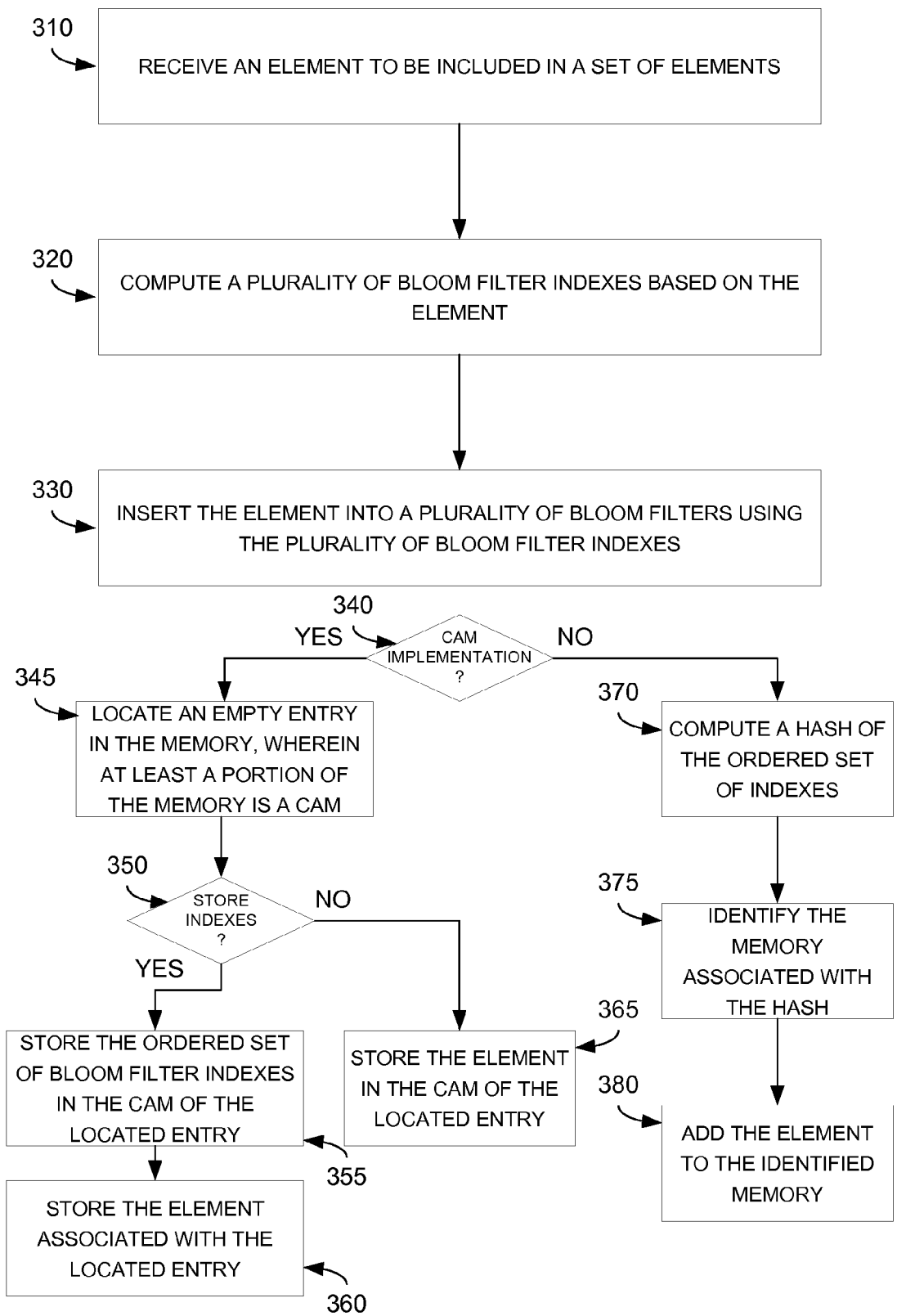

FIG. 3 is another example of a high level flow diagram for inserting an element into the set of elements that are being searched for. In block 310, just as above, an element to be included in a set of elements may be received. This set element is to be inserted into the bloom filters. In block 320, a plurality of bloom filter indexes may be computed, based on the element. In block 330, the element may be inserted into the bloom filters using the plurality of bloom filter indexes.

In block 340 it may be determined if the implementation is using a CAM. If so, the process moves to block 345. In block 345, an empty entry in the memory may be located, wherein at least a portion of the memory is a CAM. In block 350 it may be determined if the implementation is storing indexes or the element itself in the CAM. If the bloom filter indexes are being stored in the CAM, the process moves to block 355. In block 355, the ordered set of bloom filter indexes is stored in the CAM of the located entry. In block 360, the element is stored, associated with the located entry. If it is determined in block 350 that indexes are not being stored, the process moves to block 365. In block 365, the element is stored in the CAM of the located entry.

If it is determined in block 340 that the implementation is not using a CAM, the process moves to block 370. In block 370, a hash of the ordered set of indexes is computed. In block 375, memory associated with the hash is identified. In block 380, the element is added to the identified memory.

Figure 4:
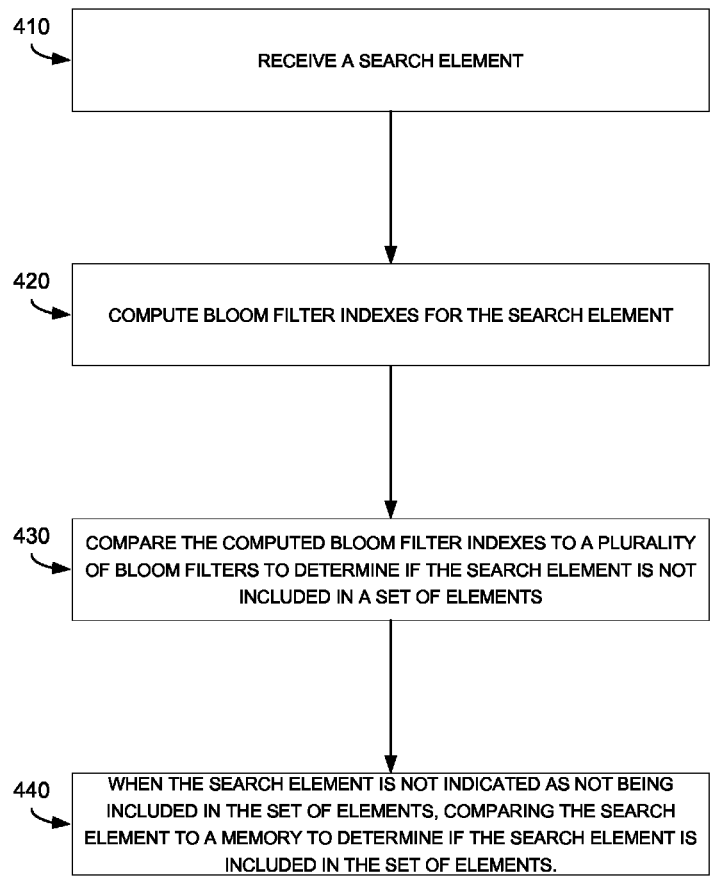
FIG. 4 is an example of a high level flow diagram for determining if an element is in a set of elements.

FIG. 4 is an example of a high level flow diagram for determining if an element is in a set of elements. In block 410, a search element may be received. The search element is the element that may be checked against the bloom filters to determine if the search element may exist in the set of elements. In block 420, bloom filter indexes may be computed for the search element. As explained above, in one implementation, the bloom filter indexes may be computed using a series of hash functions. However, it should be understood that any other method of computing bloom filter indexes would also be suitable.

In block 430, the computed bloom filter indexes may be compared to a plurality bloom filters to determine if the search element is not included in the set of elements. As explained above, if any of the bloom filters indexed by the computed indexes do not contain a true value, then the search element can definitively be determined to not be included in the set of elements. However, if all of the bloom filter indexes do contain a true value, it can be determined that the search element has the possibility of being included in the set of elements.

In block 440, when the search element is not indicated as not being included in the set of elements, the search element may be compared to a memory to determine if the search element is included in the set of elements. In other words, if the bloom filters indicate a possibility of the element being included in the set of elements, the memory may be accessed to determine if the element is actually included in the set of elements or if it is a false positive.

Figure 5:
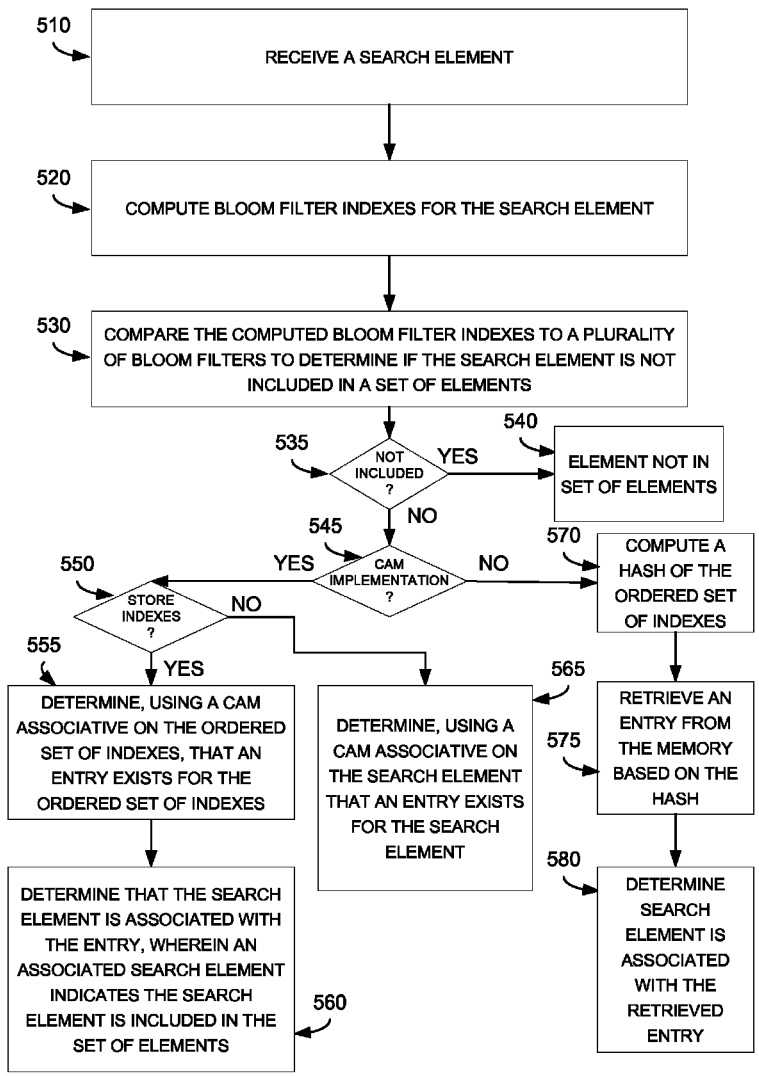
FIG. 5 is another example of a high level flow diagram for determining if an element is in a set of elements.

FIG. 5 is another example of a high level flow diagram for determining if an element is in a set of elements. In block 510, just as above, a search element may be received. In block 520, again as above, bloom filter indexes for the search element may be computed. In block 530, the computed bloom filter indexes may be compared to bloom filters to determine if the search element is possible included in the set of elements.

In block 535, it may be determined if there was a match in block 530. If there was no match, the search element is not included in the set of elements. As such, the process moves to block 540, in which it is determined that the search element is not in the set of elements because the computed bloom filter indexes are not in the bloom filter. If the determination in block 535 is that the computed bloom filter indexes are included in the bloom filter, the process moves to block 545.

In block 545 it is determined if this implementation utilizes a CAM. If so, the process moves to block 550. In block 550 it is determined if the indexes are stored in the CAM. If so, the process moves to block 555. In block 555, it may be determined, using a CAM associative on the ordered set of indexes, that an entry exists for the ordered set of indexes. In block 560, it may be determined that the search element is associated with the entry. If the search element is associated with the entry, this means that the search element is included in the set of elements.

If it is determined in block 550 that the indexes are not stored, the process moves to block 565. In block 565 it may be determined, using a CAM associative on the search element that an entry exists for the search element. If an entry exists, then this means that the search element is included in the set of elements.

If it is determined in block 545 that the implementation does not use a CAM, the process moves to block 570. In block 570, a hash of the ordered set of indexes may be computed. In block 575 an entry from the memory may be retrieved based on the hash. In block 580, it may be determined if the search element is associated with the retrieved entry. If so, this indicates that the search element is included in the set of elements.

I claim:

1. A method comprising:
   receiving a search element;
   computing bloom filter indexes for the search element;
   comparing the computed bloom filter indexes to a plurality of bloom filters to determine if the search element is not included in a set of elements; and
   when the search element is not indicated as not being included in the set of elements, comparing the search element to a memory to determine if the search element is included in the set of elements.

2. The method of claim 1 wherein the computed bloom filter indexes are an ordered set of indexes.

3. The method of claim 2 wherein comparing the search element to the memory further comprises:
   determining, using a content addressable memory associative on the ordered set of indexes, that an entry exists for the ordered set of indexes; and
   determining that the search element is associated with the entry, wherein an associated search element indicates the search element is included in the set of elements.

4. The method of claim 2 wherein comparing the search element to the memory further comprises:
   determining, using a content addressable memory associative on the search element, that an entry exists for the search element, wherein the existing entry indicates the search element is included in the set of elements.

5. The method of claim 2 wherein comparing the bloom filter indexes to the memory further comprises:
   computing a hash of the ordered set of indexes;
   retrieving an entry from the memory, wherein the entry to retrieve is based on the hash; and
   determining that the search element is associated with the retrieved entry, wherein the associated search element indicates the search element is included in the set of elements.

6. A device comprising:
   a hardware processor to execute:
   receive logic to receive a search element;
   bloom filter index logic to compute a plurality of bloom filter indexes for the search element;
   first compare logic to compare the plurality of bloom filter indexes to a plurality of bloom filters to determine if the search element is not included in a set of elements; and
   second compare logic to compare a memory associative on the plurality of bloom filter indexes to the search element when the plurality of bloom filters do not indicate that the search element is not included in the set of elements;
   wherein inclusion of the search element in the memory indicates the search element is in the set of elements.

7. The device of claim 6 wherein omission of the search element from the memory indicates the search element is not in the set of elements.

8. The device of claim 7 wherein execution of the receive logic further causes the processor to receive an insertion element, and wherein the processor is further to execute:
   hash logic to further compute a plurality of bloom filter indexes for the insertion element; and
   insert logic to (i) insert the plurality of bloom filter indexes computed for the insertion element into the plurality of bloom filters, and (ii) store the insertion element in the memory associative on the plurality of bloom filter indexes computed for the insertion element.

9. The device of claim 8 wherein the memory is associative on the plurality of bloom filter indexes computed for the insertion element via a content addressable memory.

10. The device of claim 8 wherein the memory is associative on the plurality of bloom filter indexes computed for the insertion element via a hash.

* * * * *